Patented Sept. 6, 1932

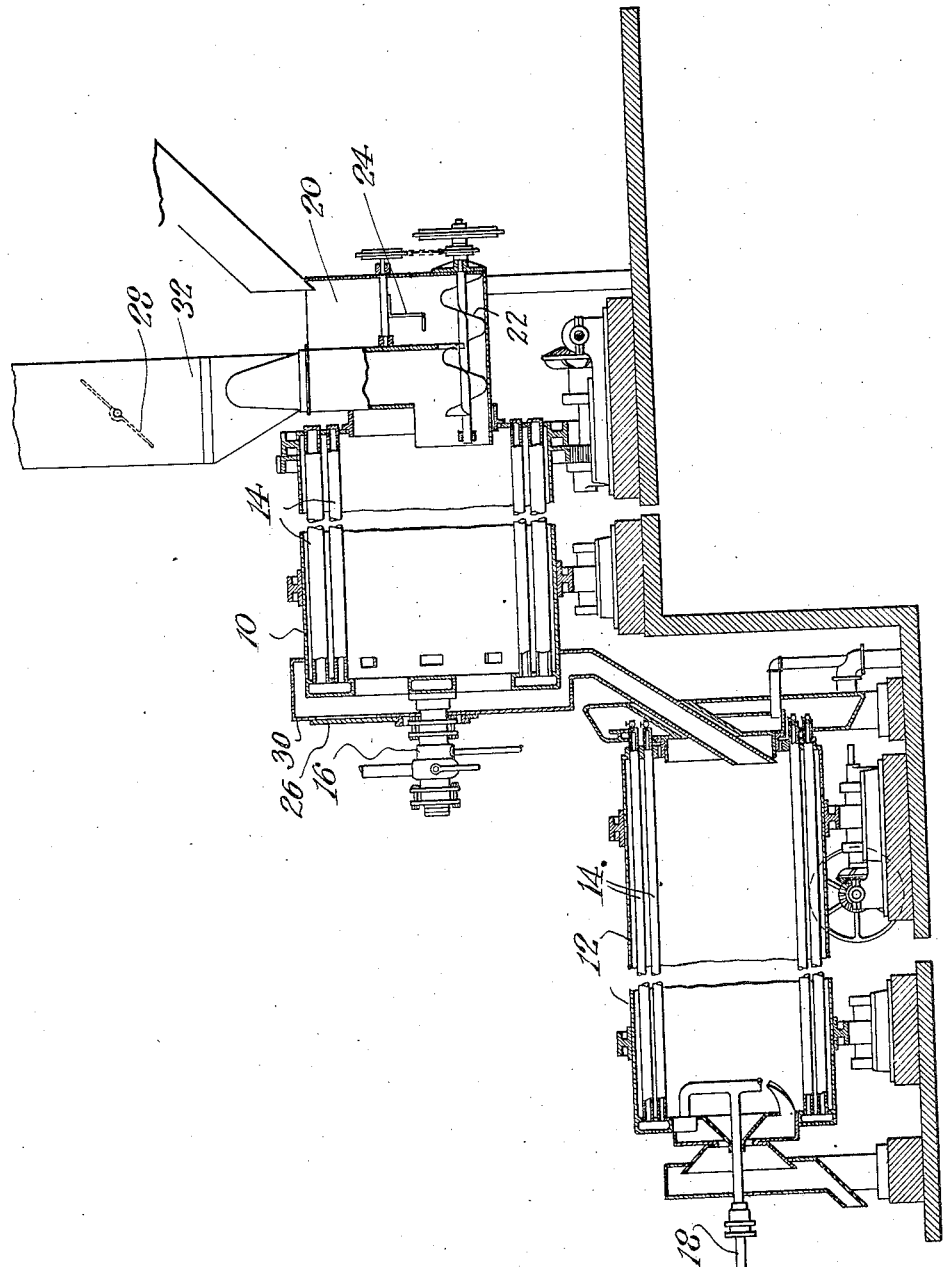

1,875,879

UNITED STATES PATENT OFFICE

RALPH H. McKEE, OF JERSEY CITY, NEW JERSEY, ASSIGNOR TO TENNESSEE COPPER AND CHEMICAL CORPORATION, A CORPORATION OF NEW YORK

ACID PHOSPHATE AND METHOD OF PRODUCING THE SAME

Application filed October 27, 1927. Serial No. 229,283.

This invention relates to acid phosphate of a peculiar and novel character which has numerous important practical advantages over ordinary commercial acid phosphates, and to a method of producing the same.

An important object of my invention is to provide a process of treating the phosphate mass resulting from subjecting phosphate rock or pebble to the action of an acid such as sulfuric acid, whereby the resulting acid phosphate will contain a materially smaller quantity of moisture than ordinary acid phosphates and in which a greater proportion of the acid phosphate is in soluble form.

Another object of my invention is to produce acid phosphates which flow materially more freely than the acid phosphates now on the market.

A further object of my invention is to produce acid phosphate having a materially smaller angle of repose than the acid phosphate of commerce, resulting in increased ease in spreading and increased spreading power when the phosphate is distributed over the ground by the ordinary fertilizer scattering machine. This smaller angle of repose also results in this acid phosphate running more freely through a fertilizer drill than does the acid phosphate of commerce.

A further object of my invention is to provide an acid phosphate having a materially higher specific gravity than acid phosphates now offered for sale for use as fertilizers.

A further object of my invention is to produce acid phosphate which is substantially or comparatively free from hydofluoic acid.

Other objects and advantages of my invention will be apparent from the following description.

Acid phosphate is commonly prepared by treating phosphate pebble or rock with sulfuric acid, and then allowing it to stand in piles to dry by evaporation of moisture into the atmosphere. The product resulting from such treatment usually varies in water soluble $P_2O_5$ content from approximately 14 to 22 per cent., depending largely on the purity of the phosphate minerals used. This treatment is very time consuming and requires many weeks to complete it, particularly if the piles are large and even if such piles are mechanically moved to expose fresh surfaces to the atmosphere. It has long been recognized that there is need for hastening the drying action of the acid phosphate so produced and several methods have been employed to effect speeding up of the drying operation. It has been attempted to increase the speed of drying the phosphate by direct heating of the material or by heating the material by means of a current of hot air. However, in each of these methods some of the soluble phosphate reverts to insoluble phosphate, thus resulting in a product, a portion of which is little suited for fertilizing purposes. Other processes have been suggested for speeding the maturing and drying of acid phosphates, but they have the disadvantages of being expensive and also result in small yields of available phosphate due to the fact that some of the soluble phosphate reverts to the insoluble form.

According to my invention, phosphate pebble or rock is treated with an approximately equal weight of mineral acid, preferably sulphuric acid, and the resulting phosphate mass is dried at an elevated temperature until the moisture content in the material is reduced to the desired low percentage, preferably between 3 and 4 per cent. by weight, by being brought intermittently into contact with hot surfaces. By this process it reaches a temperature of about 225° to 250° F. After the hot mass has reached the desired degree of dryness, it is promptly and preferably suddenly cooled by being brought into contact with a cold surface or cold surfaces.

The disintegration of the phosphate mass into particles of granular form and possessing the other desirable properties characteristic of my improved product is promoted by agitating or stirring the phosphate both while being heated and cooled, and preferably this agitation should take the form of tumbling the phosphate particles upon the heated or cooled elements, as the case may be, during the respective heating and cooling stages. Various forms of procedure may be followed in effecting such treatment and attaining the desired results so long as during the drying or heating stage heat is so applied that the temperature is maintained below the point at which any substantial portion of the phosphate will revert to the insoluble form and as soon as the material has been dried to the desired extent it is uniformly and promptly cooled.

While various forms of apparatus may be used in carrying out my process I may advantageously use a drying and cooling apparatus such as that shown in part elevation and part longitudinal section in the attached drawing. The apparatus as shown comprises a rotatable drier 10 and a rotatable cooler 12 each of about six feet diameter and about thirty-five feet in length. The inside of the drier 10 is provided with tubes 14 which preferably are of about three to four inches in diameter and are connected as at 16 to a source of steam under pressure. The cooler 12, constructed similarly to the drier, is placed adjacent the drier, and the tubes 14 carried therein instead of being connected to a source of steam, are connected as at 18 to a source of a refrigerating fluid preferably cool or cold water. A hopper 20 is provided at the upper or feed end of the drier 10. A feeder screw 22 is shown as disposed in the bottom of the hopper for feeding phosphate material forward to the drier. To prevent bridging or scaffolding of the material in the hopper a stirring arm 24 may be provided. Dampers 26 and 28 are provided respectively in the housing 30 at the exit end of the drier 10 and in the stack 32 for controlling circulation of air through the drier in amounts sufficient to carry away the moisture removed in the drying operation.

In practicing my invention, the phosphate mass resulting from the reaction of phosphate rock or pebble with sulfuric acid is taken from the den or storage pile and is introduced into the rotary drier 10 through the hopper 20 and by the aid of the feeding screw 22, and the drier is rotated preferably at about seven revolutions per minute. Saturated steam at a preferred pressure of 80 pounds and corresponding temperature, is admitted into the tubes within the drier and in the drying operation the mass of acid phosphate is intermittently brought into contact with the surfaces of the thus heated tubes. After the phosphate material has been sufficiently dried it is transferred immediately (at which time it has a temperature of about 235° F.) to the rotary cooler 12 where by contact with the refrigerating or cooling tubes therein it is promptly cooled to about normal atmospheric temperature, after which it is discharged from the cooler and may be packed for shipment. The steam within the pipes of the rotary drier is preferably maintained at a pressure of 80 to 90 pounds per square inch. A drier such as above described has a capacity of about 200 to 300 tons each twenty-four hours. A current of air should be passed through the drier in amount sufficient to carry off moisture as evolved in the drying operation, and a current of air may also be passed through the cooler in order to produce a slight additional cooling, but the main drying and cooling is produced by contact of the phosphate mass with the tubes or pipes containing the steam and cooling fluid respectively.

By my process of intermittently bringing the phosphate mass into contact with hot surfaces and then rapidly cooling it as above described, it is possible to reduce the moisture content of the phosphate mass from about 14 per cent. which is its ordinary moisture content as it comes from the den or storage pile to a product carrying only about three per cent. by weight of moisture. This product carrying only from three to four per cent. moisture has numerous important advantages over the acid phosphate of commerce which usually contains about 8 to 10 per cent. moisture.

Among the distinguishing features and advantages of my product over ordinary acid phosphate may be mentioned, First: Its low moisture content. Second: In my product the ordinary cellular structure of acid phosphate is broken down and in its place a granular structure or form is obtained. Third: The breaking down of the cellular structure of the material combined with the drying materially decreases the content of hydrofluoric acid below that of the ordinary phosphate. Fluoride compounds are poisonous in foods, and decrease of the hydrofluoric acid in a fertilizer tends to decrease the amount of fluorine in the product grown for food. Because my product has a smaller quantity of hydrofluoric acid, the jute bags customarily used for shipping phosphate may often be reused, whereas the bags used for shipping ordinary acid phosphate are so affected by the hydrofluoric acid present that they cannot be used a second time. Fourth: My product is more granular than acid phosphate now on the market, runs more easily when poured and is decidedly more dense. For example, my product as ordinarily packed will weigh from 70 to 80 pounds per cubic foot, the average of several lots which were weighed being 78 pounds per cubic foot. The usual acid phosphate, though it appears to the eye, and feels to the hand more dense than my product, actually weighs only 50 to 60 pounds per cubic foot. Fifth: When poured from a vessel, my product has a very low angle of repose. For example, similar amounts of my acid phosphate and ordinary commercial acid phosphate were poured through the same funnel held two feet above a table. My material assumed an angle of repose from the horizontal of about twentyfive degrees, whereas the ordinary commercial acid phosphate had an angle of repose of about forty-five degrees. It will be seen from this that my product flows much more freely than the ordinary commercial acid phosphate. Sixth: Though my material moves like dry round grained sand and flows freer than the ordinary commercial acid phosphate, it is freer from dust than the ordinary acid phosphate. For example, on sieving through a screen having eighty meshes to the linear inch, the percentage of my product passing through the screen is normally only 25 to 30 per cent., whereas the amount of commercial acid phosphate of the usual type (carrying 8.5 per cent. moisture) which will pass through the same screen under the same conditions is 50 per cent. or over. The ordinary limitation in grinding phosphate pebble or rock for treatment with sulfuric acid is that the material must not be so finely ground as to result in too much dust in the finished product. Due to the character of my product, and especially its lower percentage of dust, I can use phosphate pebble or phosphate rock which is more finely ground than that ordinarily suitable for the production of phosphate, and due to the use of finer ground phosphate material, less excess of sulfuric acid need be used for the substantially complete reaction to form acid phosphates. Because of the smaller quantity of sulphuric acid used, the resulting product will carry a higher percentage of available phosphoric acid and be free from free sulfuric acid. Seventh: Acid phosphate when dried as herein described does not show any reversion of the soluble phosphate to the insoluble form, whereas processes of drying phosphate involving the application of heat known previous to my invention result in partial reversion of the phosphate. Eighth: My product, due to its granular structure, freedom from free hydrofluoric and sulfuric acids, and its increased density, can be shipped in smaller size and lighter weight bags, made of cotton or even paper, than could the acid phosphates previously known. Ninth: Acid phosphate prepared according to my process if compacted by hand pressure, has been found to break into small particles on dropping from a height of one or two inches on to a hard surface, whereas ordinary acid phosphate similarly compacted breaks into relatively large lumps. It will be obvious therefore that my acid phosphate is more easily spread over the ground than is the ordinary acid phosphate now commonly in use. Tenth: My product carrying a moisture content of only 3 to 4 per cent., enables a large saving in freight over ordinary acid phosphates which usually contain 8 to 10 per cent. moisture. Eleventh: A particularly important advantage of my acid phosphate over the ordinary acid phosphates of commerce and which is perhaps its most important advantage from a commercial standpoint, is that my material runs more readily through the drill or ferilizer scattering machine used by the farmer, and can therefore be handled with much less trouble than acid phosphates commonly on the market. This freeness of flow eliminates many difficulties in the drilling and spreading of the phosphate by the fertilizer distributing or scattering machines. Twelfth: In the ordinary processes of making acid phosphate, the phosphate mass resulting from the treatment of phosphate rock or pebble with sulfuric acid is stored in a den and then after being removed from the den is piled in storage piles for several months before it is suitable for use. By employing my drying process the phosphate mass may be dried after having been removed from the den and allowed to remain in piles for only a few days. In fact it is not even necessary to pile the phosphate after removing from the den, but the phosphate taken directly from the den may at once be dried according to the process which I have described. Acid phosphate is ordinarily shipped at two seasons of the year, about April 1st, and September 1st. According to the old processes it was necessary to stop manufacture of the product about two months prior to shipment so that sufficient atmospheric drying of the phosphate in the storage piles could take place. The effect of this is that plants employing the old processes have to stop manufacturing their phosphate about the last of January so that the material will be in proper condition for shipment the first of April, and again stop manufacture a corresponding time before shipments are made in September. With my process of drying phosphate mass, the plant may be kept in operation continuously throughout the year.

Although I have described the preferred practice of my process it is to be understood that the details of procedure may be variously modified without departing from the spirit of my invention or the scope of the subjoined claims.

I claim:

1. The herein described process of treating acid phosphate, comprising intermittently contacting such phosphate in finely divided form with positively heated elements to remove moisture and impart a granular structure thereto, continuing such treatment until the moisture content of the phosphate has been reduced to below about 4%, and thereafter promptly cooling the phosphate.

2. The herein described process of treating acid phosphate, comprising intermittently contacting such phosphate in finely divided form with positively heated elements to remove moisture and impart a granular structure thereto, continuing such treatment until the moisture content of the phosphate has been reduced to below about 4%, and thereafter promptly cooling the phosphate by intermittently contacting it with positively cooled elements.

3. The herein described process of treating acid phosphate, comprising intermittently contacting such phosphate in finely divided form with positively heated elements to heat it to a temperature of about 225–250° F., and thereafter promptly cooling the phosphate.

4. The herein described process of treating acid phosphate, comprising intermittently contacting such phosphate in finely divided from with positively heated elements to heat it to a temperature of about 225–250° F., and thereafter promptly cooling the phosphate by intermittently contacting it with positively cooled elements.

5. In the herein described process of treating acid phosphate, the step of intermittently contacting the phosphate with positively heated elements to remove moisture and impart a granular structure thereto, continuing such treatment until the moisture content of the phosphate has been reduced to below about 4%.

6. The herein described process of treating acid phosphate comprising intermittently contacting such phosphate in finely divided form against elements positively heated to a temperature of about 225–250° F., while limiting circulation of air through the heating zone to that amount required merely to withdraw moisture evolved from the phosphate, continuing such treatment until the moisture content of the phosphate has been reduced to below about 4%, and thereafter promptly cooling the phosphate.

In testimony whereof I affix my signature.

RALPH H. McKEE.